US008187132B2

(12) United States Patent
Eto et al.

(10) Patent No.: US 8,187,132 B2

(45) Date of Patent: May 29, 2012

(54) VEHICLE CONTROLLER AND CONTROL METHOD

(75) Inventors: Shingo Eto, Toyota (JP); Yoshio Hasegawa, Chiryu (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 212 days.

(21) Appl. No.: 12/678,675

(22) PCT Filed: Sep. 16, 2008

(86) PCT No.: PCT/JP2008/067214

§ 371 (c)(1), (2), (4) Date: Mar. 17, 2010

(87) PCT Pub. No.: WO2009/038213

PCT Pub. Date: Mar. 26, 2009

(65) Prior Publication Data

US 2010/0210415 A1 Aug. 19, 2010

(30) Foreign Application Priority Data

Sep. 19, 2007 (JP) ................................ 2007-242098

(51) Int. Cl.
*F16H 61/20* (2006.01)

(52) U.S. Cl. ....................................... 475/120; 477/117

(58) Field of Classification Search ................. 477/116, 477/117, 114; 475/118, 120

See application file for complete search history.

(56) References Cited

U.S. PATENT DOCUMENTS

| | | | | |
|---|---|---|---|---|
| 5,046,178 | A * | 9/1991 | Hibner et al. | 701/60 |
| 5,795,262 | A * | 8/1998 | Robinson | 477/92 |
| 2005/0064988 | A1 | 3/2005 | Hasegawa et al. | |
| 2008/0076633 | A1 | 3/2008 | Nagai et al. | |
| 2008/0172161 | A1 | 7/2008 | Kondo et al. | |
| 2009/0005218 | A1 * | 1/2009 | Lowe et al. | 477/116 |

FOREIGN PATENT DOCUMENTS

| | | | |
|---|---|---|---|
| EP | 0 679 819 | A2 | 11/1995 |
| EP | 0 742 387 | A2 | 11/1996 |
| EP | 0 742 388 | A2 | 11/1996 |
| EP | 0 789 170 | A2 | 8/1997 |
| JP | 10-103466 | A | 4/1998 |
| JP | 2005-042742 | A | 2/2005 |
| JP | 2006-250287 | A | 9/2006 |

OTHER PUBLICATIONS

Office Action dated Sep. 13, 2011 issued in a corresponding Japanese Patent Application No. 2007-242098.

* cited by examiner

*Primary Examiner* — Sherry Estremsky

(74) *Attorney, Agent, or Firm* — Sughrue Mion, PLLC

(57) ABSTRACT

When initial control ends, an ECU executes a program that includes the steps of: calculating a return control progression degree; calculating a target amount of change in turbine speed; calculating a feedback gain; calculating a target turbine speed; calculating a deviation between the target turbine speed and turbine speed NT; determining a hydraulic pressure command value; outputting the hydraulic pressure command; and when the turbine speed is synchronized with a first gear synchronization speed, outputting the maximum hydraulic pressure command.

20 Claims, 7 Drawing Sheets

1000 ECU
350 INPUT I/F
ENGINE SPEED SIGNAL
TURBINE SPEED SIGNAL
OUTPUT SHAFT SPEED
STOP LAMP SWITCH SIGNAL
450 OPERATING UNIT
452 RETURN CONTROL DETERMINING UNIT
454 START SPEED HOLDING UNIT
456 INITIAL CONTROL UNIT
458 PROGRESSION DEGREE CALCULATING UNIT
460 TARGET VALUE CALCULATING UNIT
462 HYDRAULIC PRESSURE COMMAND VALUE DETERMINING UNIT
464 HYDRAULIC PRESSURE CONTROL SIGNAL OUTPUT UNIT
466 SYNCHRONIZATION DETERMINING UNIT
468 TERMINAL CONTROL UNIT
550 STORAGE UNIT
650 OUTPUT I/F
HYDRAULIC PRESSURE CONTROL SIGNAL

F I G. 1
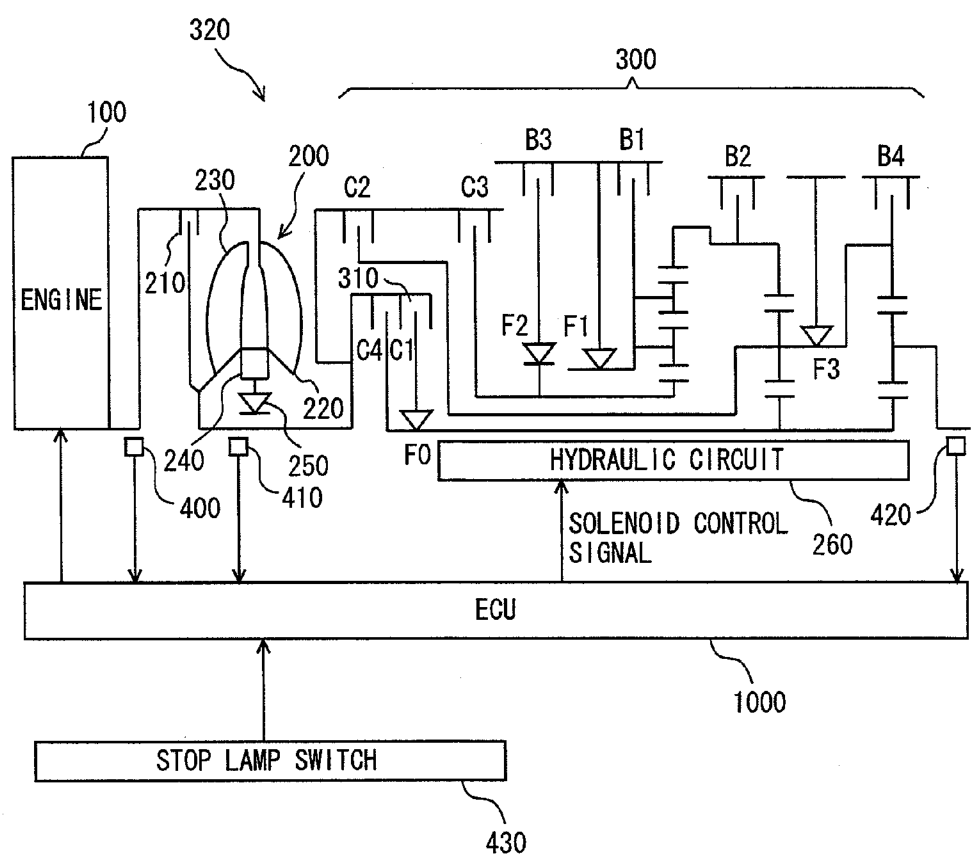

F I G. 2

| | C1 | C2 | C3 | C4 | B1 | B2 | B3 | B4 | F0 | F1 | F2 | F3 |
|---|---|---|---|---|---|---|---|---|---|---|---|---|
| P | | | | | | | | | | | | |
| R | | | ○ | | ◎ | | | ○ | | ○ | | |
| N | | | | | | | | | | | | |
| 1st | ○ | | | ◎ | | | | ◎ | ○ | | | ○ |
| 2nd | ○ | | | ◎ | | ◎ | ○ | | ○ | ○ | ○ | |
| 3rd | ○ | | ○ | ◎ | ◎ | | △ | | ○ | ○ | | |
| 4th | ○ | ○ | △ | ◎ | | | △ | | ○ | | | |
| 5th | △ | ○ | ○ | | ○ | | △ | | | | | |
| 6th | △ | ○ | | | △ | ○ | △ | | | | | |

○ENGAGED
◎ENGAGED WHEN ENGINE BRAKE IS ON
△ENGAGED BUT NOT RELATED TO POWER TRANSMISSION

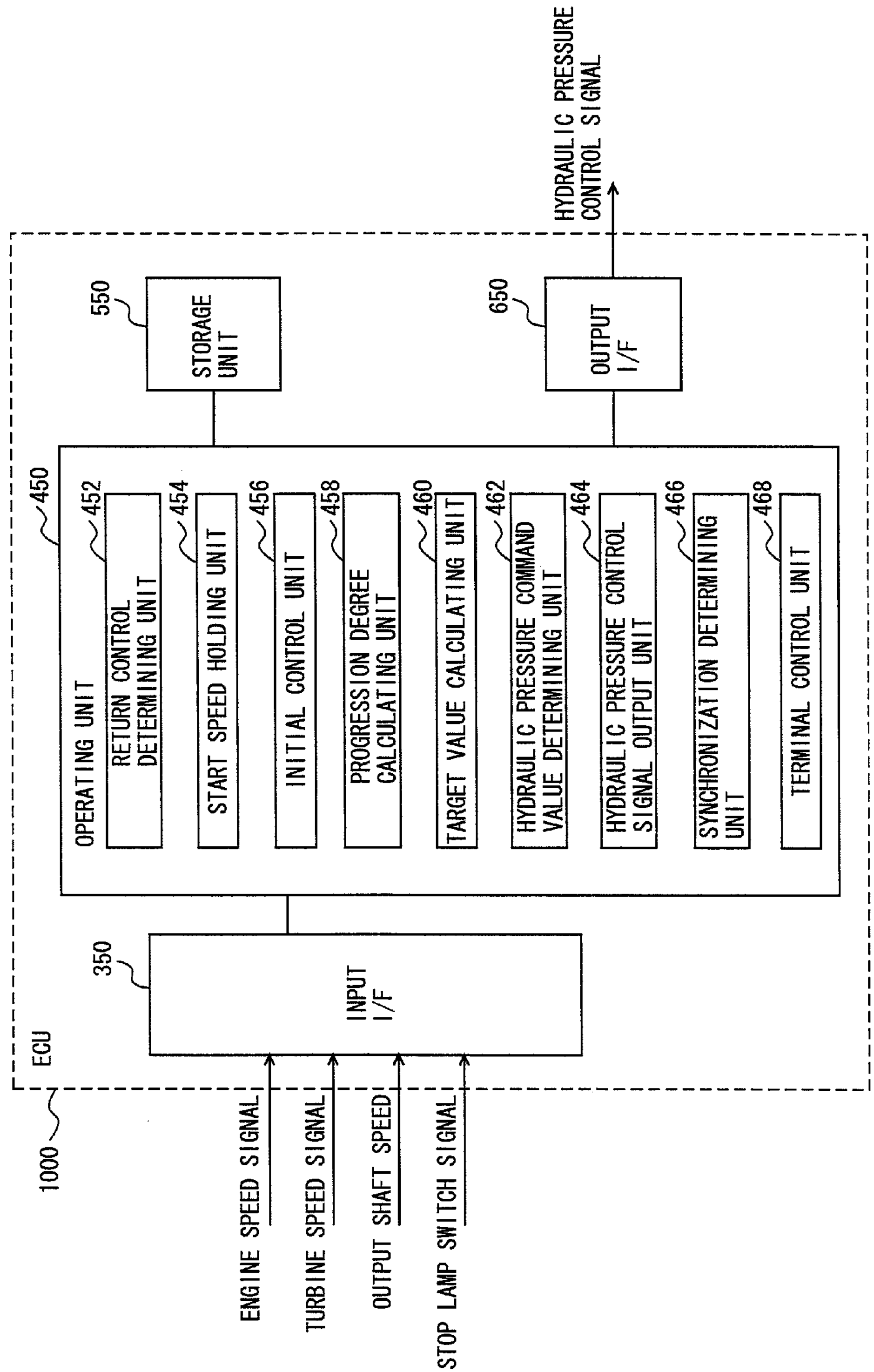
F I G. 3
1000
ECU
350
INPUT I/F
450
OPERATING UNIT
452
RETURN CONTROL DETERMINING UNIT
454
START SPEED HOLDING UNIT
456
INITIAL CONTROL UNIT
458
PROGRESSION DEGREE CALCULATING UNIT
460
TARGET VALUE CALCULATING UNIT
462
HYDRAULIC PRESSURE COMMAND VALUE DETERMINING UNIT
464
HYDRAULIC PRESSURE CONTROL SIGNAL OUTPUT UNIT
466
SYNCHRONIZATION DETERMINING UNIT
468
TERMINAL CONTROL UNIT
550
STORAGE UNIT
650
OUTPUT I/F
HYDRAULIC PRESSURE CONTROL SIGNAL
ENGINE SPEED SIGNAL
TURBINE SPEED SIGNAL
OUTPUT SHAFT SPEED
STOP LAMP SWITCH SIGNAL F I G. 4
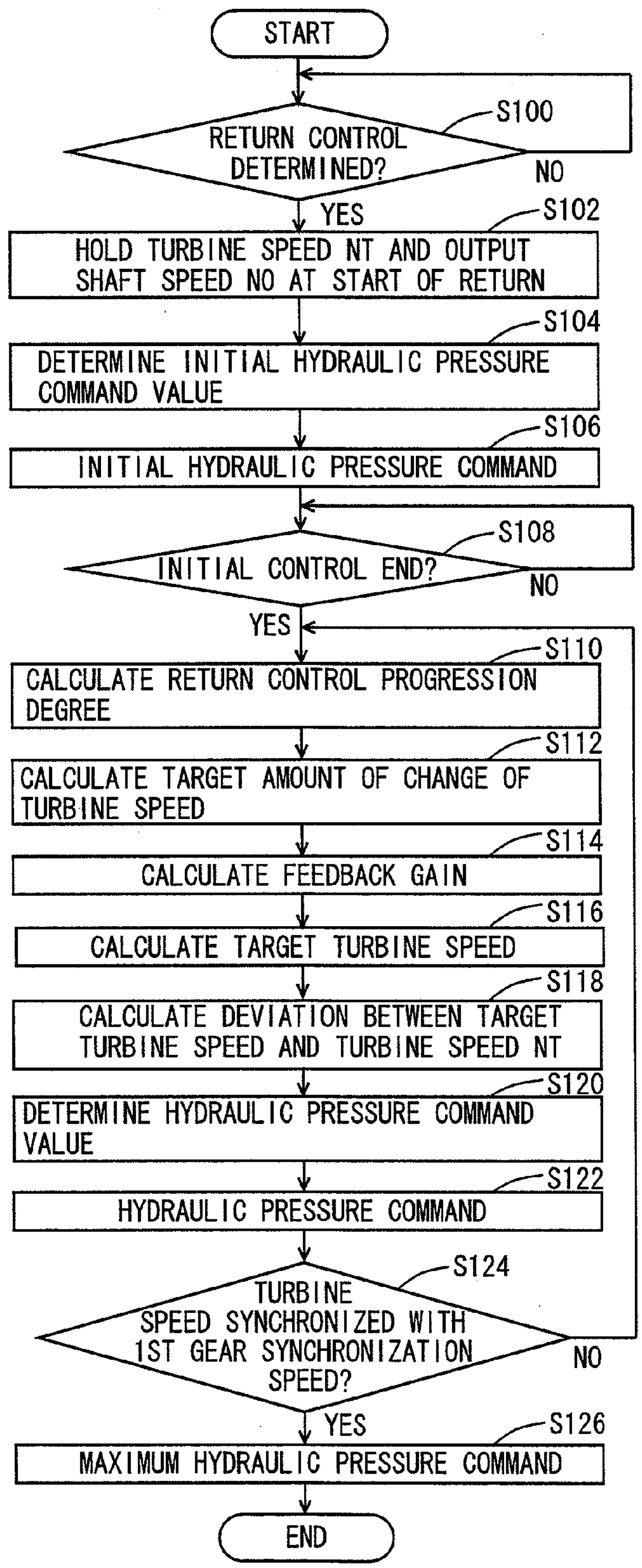

F I G. 5
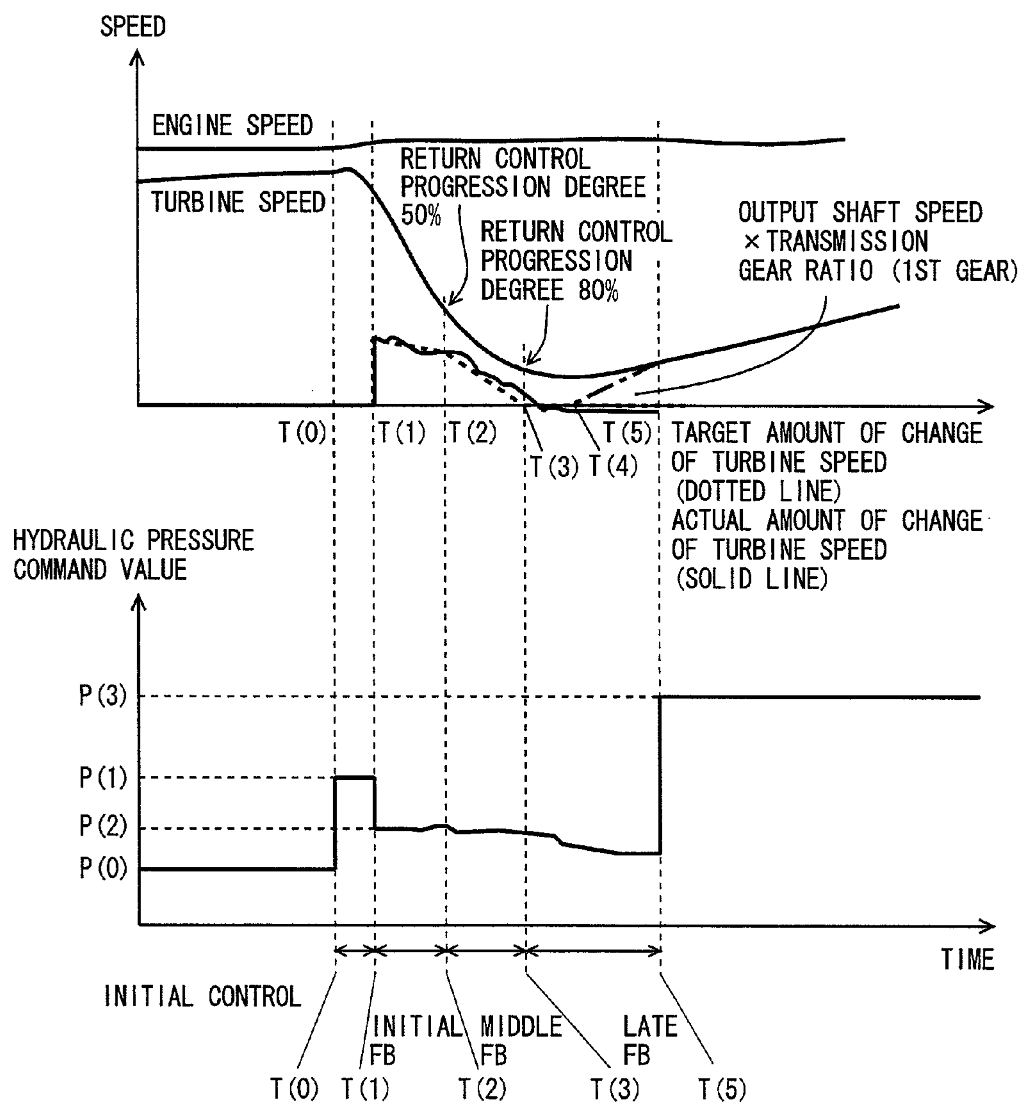

F I G. 6
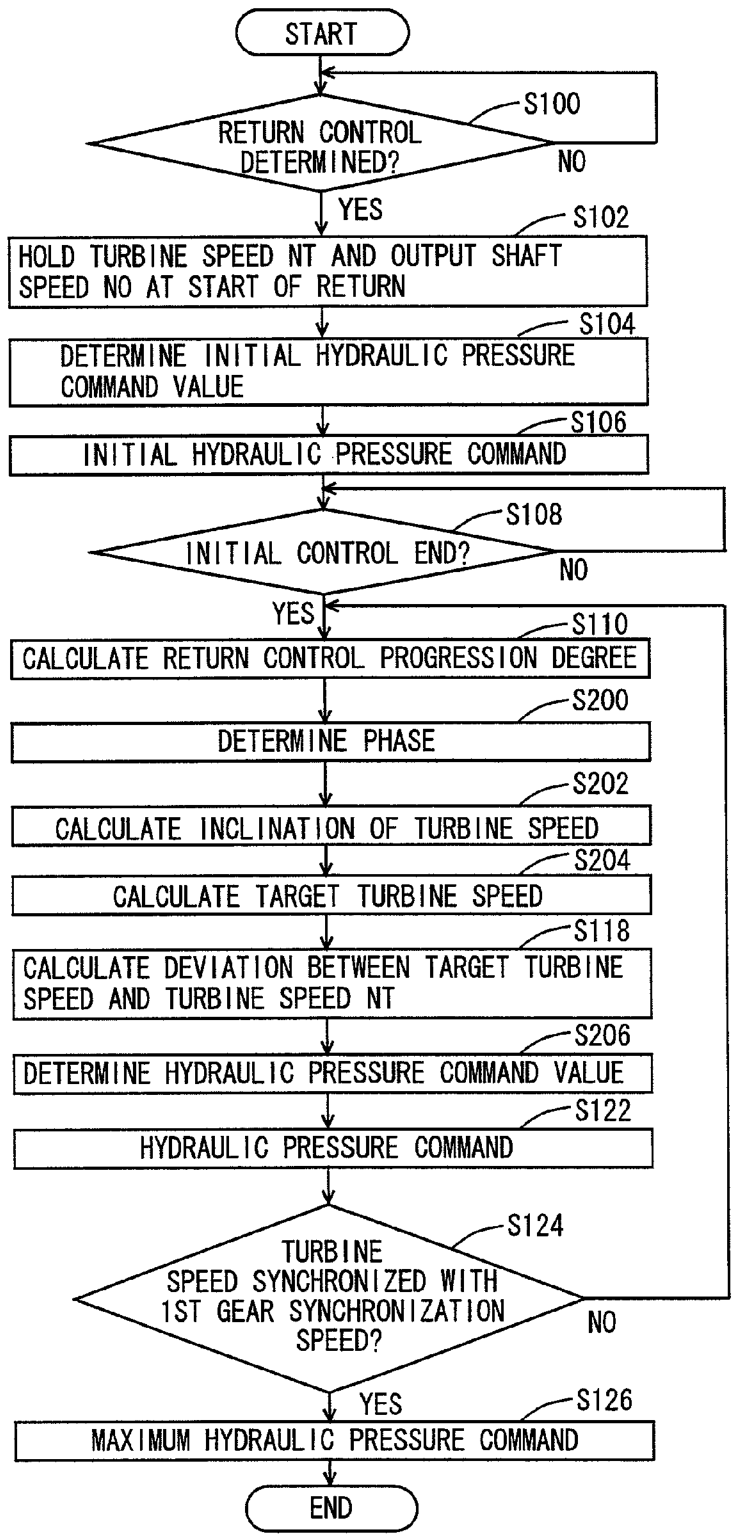

F I G. 7
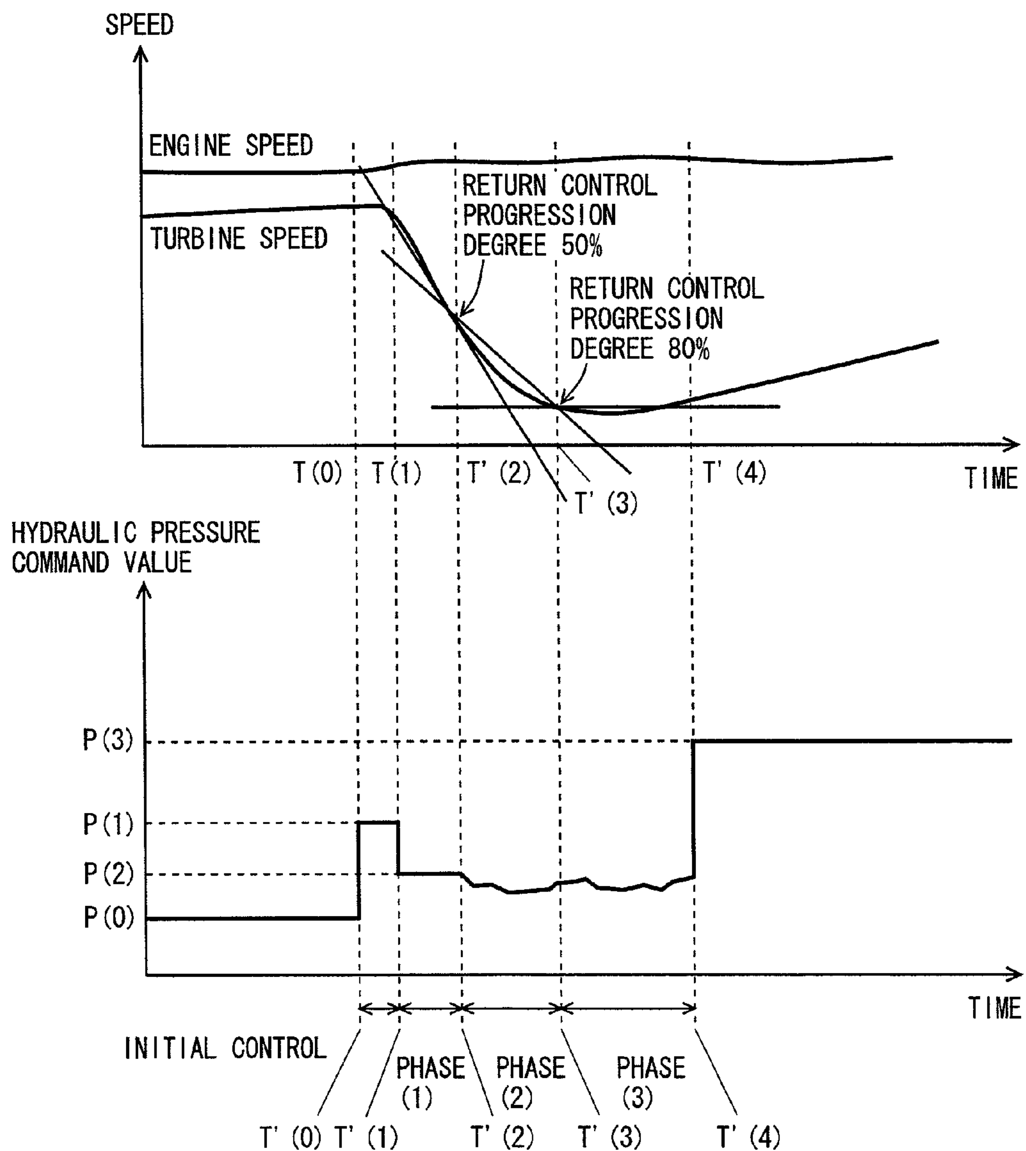

VEHICLE CONTROLLER AND CONTROL METHOD

TECHNICAL FIELD

The present invention relates to control of a vehicle with automatic transmission and, more specifically, to control of a return from neutral control.

BACKGROUND ART

When an automatic transmission of a vehicle is set to a forward drive position and the vehicle is stopped, driving force of an idling engine is transmitted through a torque converter to the transmission and wheels. As a result, creeping occurs. Such creeping leads to lower mileage when the vehicle is stopped. Therefore, in a state in which a brake pedal is stepped on to operate the brake and an accelerator is substantially fully closed so that the vehicle is stopped in forward drive position, neutral control takes place, in which the transmission is set to an almost neutral state with the forward drive position being maintained, in order to attain better mileage. In the neutral control, an engaging element that is engaged at the start of the vehicle is released, to bring the transmission to the substantially neutral state. When returning conditions such as releasing of the brake are satisfied, a return control takes place, in which the released engaging element is engaged again.

By way of example, Japanese Patent Laying-Open No. 2005-42742 discloses a starting controller that enables reliable return from the neutral control. The starting controller is for a vehicle mounting an automatic transmission having an engaging element that is engaged when the vehicle starts. If the vehicle stops in the forward drive position while predetermined conditions of vehicle state are satisfied, the neutral control is executed and the engaging element is released, and if separately determined conditions are satisfied, a return control from the neutral control is executed. The starting controller includes means for detecting engine speed, and calculating means for calculating engaging hydraulic pressure of engaging element on return from the neutral control based on engine speed fluctuation.

According to the starting controller disclosed in the laid-open application, a constant standby pressure is calculated in consideration of engine speed fluctuation. As a result, a vehicle starting controller can be provided, which enables reliable return from the neutral control in accordance with the engine state, on return from the neutral control.

It is possible, however, that necessary hydraulic pressure of engaging element differ at every return from the neutral state, because of variations in torque ratio change in a torque converter or engine torque. Therefore, in the return control from the neutral control, necessary engaging hydraulic pressure of engaging element would not be obtained with high accuracy if the control much depends on feed forward control. If the hydraulic pressure supplied to the engaging element on the return from neutral control is too high or too low, abrupt engagement at the start of return control or abrupt engagement at the end of return control occurs, possibly resulting in a shock.

In the laid-open application mentioned above, simply the constant standby pressure is changed in accordance with the engine speed fluctuation and it much depends on feed forward control. Therefore, such a problem cannot be solved.

Further, in the return control, relative rotation speeds on the input shaft side and output shaft side of engaging element are decreased for transition to the engaged state. Therefore, even when the hydraulic pressure of engaging element is adjusted so that turbine speed comes close to a target value, it is sometimes impossible to obtain necessary engaging hydraulic pressure of engaging element with high accuracy, because of variations in engine torque or torque ratio change.

SUMMARY OF THE INVENTION

An object of the present invention is to provide a controller and a control method for a vehicle enabling quick return from the neutral control without causing any shock.

According to an aspect, the present invention provides a vehicle controller for a vehicle provided with an engine and an automatic transmission having an engaging element engaged by using hydraulic pressure when the vehicle starts. When the vehicle stops in a forward drive position while predetermined conditions of vehicle state are satisfied, neutral control of releasing the engaging element is executed, and when separately determined conditions are satisfied, a return control of engaging the engaging element is executed. The automatic transmission includes a fluid coupling coupled to an output shaft of the engine, a transmission mechanism coupled to an output shaft of the fluid coupling and a hydraulic circuit applying hydraulic pressure to the engaging element. The controller includes a turbine speed sensor detecting turbine speed of the fluid coupling, and a control unit connected to the turbine speed sensor. The control unit calculates degree of progress of the return control based on the detected turbine speed during the return control, sets a target amount of change of the turbine speed in accordance with the calculated degree of progress, and controls the hydraulic circuit based on the set target amount of change in the return control.

According to the invention, at the start of return control (degree of progress being small) from the neutral control, in the automatic transmission, the engaging element is in substantially neutral state. Therefore, the turbine speed increases to be higher than when the element is in the engaged state. As the return control proceeds (degree of progress increases), the engaging element comes to be engaged. Therefore, as the transition to the engaged state proceeds, the turbine speed lowers because of drag of the fluid coupling. Therefore, the degree of progress of return control calculated based on the turbine speed corresponds to the state of change of the engaging element including variations caused by a change in engine torque or torque ratio. Therefore, when the degree of progress is small and the state is closer to neutral, the turbine speed can be lowered faster if the absolute value of target amount of change is increased. As a result, the time necessary for the return control can be reduced. Further, even when the turbine speed decreases quickly, occurrence of any shock can be curbed as the automatic transmission is in an almost neutral state. Further, when the absolute value of target amount of change is made smaller as the return control proceeds, the variation in turbine speed is reduced and occurrence of engagement shock at the end of return control can be curbed. Since the hydraulic pressure applied to the engaging element is controlled based on the target amount of change, hydraulic pressure control better reflecting the variation caused by a change in engine torque or torque ratio becomes possible, than when the hydraulic pressure is controlled such that the turbine speed is made closer to the target value. Consequently, it becomes possible to apply hydraulic pressure necessary for return control to the engaging element with higher accuracy. Therefore, vehicle controller and vehicle control method that enable quick recovery from the neutral control without causing any shock can be provided.

Preferably, the control unit sets the target amount of change to have smaller absolute value as the degree of progress becomes higher.

According to the present invention, when the degree of progress is small and the state is closer to neutral, the turbine speed can be lowered faster by setting larger the absolute value of target amount of change. As a result, the time necessary for the return control can be reduced. Further, even when the turbine speed decreases quickly, occurrence of any shock can be curbed as the automatic transmission is in an almost neutral state. Alternatively, by setting smaller the absolute value of target amount of change as the return control proceeds, the variation in turbine speed is curbed and occurrence of engagement shock at the end of return control can be prevented. Therefore, even if there is any variation in engine torque or torque ratio change, quick recovery from the neutral control is possible without causing any shock.

More preferably, the control unit sets the absolute value of the target amount of change to a predetermined value smaller than the absolute value of target amount of change set last time, when the degree of progress proceeds exceeding a predetermined degree.

According to the present invention, when the degree of progress is small and the state is closer to neutral, the absolute value of target amount of change is set larger, so that the turbine speed can be lowered faster. As a result, the time necessary for the return control can be reduced. Further, even when the turbine speed decreases quickly, occurrence of any shock can be curbed as the automatic transmission is in an almost neutral state. Alternatively, the absolute value of target amount of change is set smaller as the return control proceeds. As a result, the variation in turbine speed is curbed and occurrence of engagement shock at the end of return control can be prevented. Therefore, even if there is any variation in engine torque or torque ratio change, quick recovery from the neutral control is possible without causing any shock.

More preferably, the control unit sets a target turbine speed based on the set target amount of change, and controls the hydraulic circuit such that a hydraulic pressure determined based on a difference between the target turbine speed and the detected turbine speed and on a difference between the target amount of change and an amount of change in the turbine speed is applied to the engaging element According to the present invention, the hydraulic circuit is controlled such that the hydraulic pressure determined based on the difference between the target turbine speed and the detected turbine speed and on the difference between the target amount of change and the amount of change in the turbine speed is applied to the engaging element. Particularly, the target amount of change is set dependent on the degree of progress of return control, and hence it is possible to have the state of change in turbine speed in the return control set to the same state every time the return control is conducted, regardless of any change in engine torque or torque ratio. Therefore, quick recovery from the neutral control is possible while preventing occurrence of any shock, every time the return control takes place.

More preferably, the control unit sets the target turbine speed based on the target amount of change using current turbine speed as a starting point.

According to the present invention, using the current turbine speed as a starting point, the target turbine speed is set based on the target amount of change. The target amount of change is set in accordance with the degree of progress of the return control and, therefore, the state of transition of engaging element from the released state to the engaged state can be set to the same state in the return control every time the return control takes place, regardless of any change in engine torque or torque ratio.

More preferably, the control unit sets the target turbine speed based on the target amount of change using turbine speed at a time point when the target amount of change is set as a starting point.

According to the present invention, using the turbine speed at the time of setting the target amount of change as a starting point, the target turbine speed is set base on the target amount of change. The target amount of change is set in accordance with the degree of progress of the return control and, therefore, the state of transition of engaging element from the released state to the engaged state can be set to the same state in the return control every time the return control takes place, regardless of any change in engine torque or torque ratio.

More preferably, the controller further includes an output shaft speed sensor connected to the control unit and detecting output shaft speed of the transmission mechanism. The control unit controls the hydraulic circuit such that maximum hydraulic pressure is applied to the engaging element when a product of the detected output shaft speed and transmission gear ratio at the start of the vehicle is synchronized with the detected turbine speed.

According to the present invention, at a time point when the value as a product of output shaft rotation speed and transmission gear ratio at the start of the vehicle is synchronized with the detected turbine speed, relative rotation speed between the input shaft side and the output shaft side of the engaging element attains to substantially zero and the hydraulic circuit is controlled such that the maximum hydraulic pressure is applied. Therefore, the engaging element can be set to the fully engaged state while preventing occurrence of any shock.

More preferably, the control unit calculates the degree of progress by dividing the detected turbine speed by the turbine speed detected at a start of the return control.

According to the present invention, in the return control from the neutral control, when the engaging element comes to be the engaged state from the almost neutral state, the fluid coupling drags and, therefore, the turbine speed gradually decreases as the engagement of engaging element proceeds. Therefore, by dividing the current turbine speed by the turbine speed detected at the start of return control, the degree of progress of the return control can be calculated.

More preferably, the control unit calculates the degree of progress by dividing a first difference of rotation speed between input shaft side and output shaft side of the engaging element by a second difference of rotation speed between the input shaft side and the output shaft side of the engaging element at the start of the return control.

According to the present invention, in the return control from the neutral control, when the engaging element comes to be the engaged state from the almost neutral state, the fluid coupling drags and, therefore, the turbine speed gradually decreases as the engagement of engaging element proceeds. Therefore, by dividing the first difference of rotation speed by the second difference of rotation speed, the degree of progress of the return control can be calculated.

More preferably, the first difference of rotation speed represents a difference between the detected turbine speed and a product of the output shaft speed of transmission mechanism and a transmission gear ratio when the vehicle starts. The second difference of rotation speed represents a difference, at the start of the return control, between the detected turbine speed and a product of the output shaft speed of transmission mechanism and the transmission gear ratio when the vehicle starts.

According to the present invention, in the return control from the neutral control, when the engaging element comes to be the engaged state from the almost neutral state, the fluid coupling drags and, therefore, the turbine speed gradually decreases as the engagement of engaging element proceeds. Therefore, by dividing the difference between the current turbine speed and the value as a product of the output shaft speed and the transmission gear ratio at the start of the vehicle by the difference at the start of return control between the detected turbine speed and the value as a product of output shaft rotation speed of the transmission mechanism and the transmission gear ratio at the start of the vehicle, the degree of progress of the return control can be calculated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows a configuration of a power train of a vehicle.

FIG. 2 is an operation table of an automatic transmission.

FIG. 3 is a functional block diagram of an ECU as a controller for the vehicle in accordance with a first embodiment.

FIG. 4 is a flowchart representing a control structure of a program executed by the ECU as the controller for the vehicle in accordance with the first embodiment.

FIG. 5 is a timing chart representing an operation of the ECU as the controller for the vehicle in accordance with the first embodiment.

FIG. 6 is a flowchart representing a control structure of a program executed by the ECU as the controller for the vehicle in accordance with a second embodiment.

FIG. 7 is a timing chart representing an operation of the ECU as the controller for the vehicle in accordance with the second embodiment.

BEST MODES FOR CARRYING OUT THE INVENTION

In the following, embodiments of the present invention will be described with reference to the figures. In the following description, the same components are denoted by the same reference characters. Their names and functions are also the same. Therefore, detailed description thereof will not be repeated.

<First Embodiment>

Referring to FIG. 1, the power train of a vehicle on which the controller for a vehicle in accordance with the present embodiment is mounted will be described. The controller for a vehicle in accordance with the present embodiment is, specifically, implemented by an ECU (Electronic Control Unit) 1000 shown in FIG. 1.

As shown in FIG. 1, the power train of the vehicle includes an engine 100, an automatic transmission 320, and ECU 1000. Automatic transmission 320 includes a torque converter 200 as a fluid coupling, and a transmission mechanism 300 formed of a planetary gear unit.

Though automatic transmission 320 is described as a gear type automatic transmission in the present embodiment, it may be any automatic transmission that has a frictional engaging element that is engaged at least at the start of the vehicle. By way of example, a continuously variable automatic transmission having a transmission mechanism for continuously changing the transmission gear ratio using a belt may be used.

An output shaft of engine 100 is connected to an input shaft of torque converter 200. Engine 100 and torque converter 200 are coupled by a rotation shaft. Therefore, an output shaft rotation speed NE of engine 100 (hereinafter referred to as engine speed NE) detected by an engine speed sensor 400 is the same as an input shaft rotation speed (pump rotation speed) of torque converter 200. Engine speed sensor 400 transmits a signal representing the detected engine speed NE to ECU 1000.

Torque converter 200 includes a lock-up clutch 210 for directly coupling the input shaft and the output shaft, a pump impeller 220 on the input shaft side, a turbine impeller 230 on the output shaft side, and a stator 240 having a one-way clutch 250 and exhibiting a torque amplifying function. Torque converter 200 and transmission mechanism 300 are connected by a rotation shaft.

An output shaft rotation speed NT of torque converter 200 (in the following, referred to as a turbine speed NT) is detected by a turbine speed sensor 410. Turbine speed sensor 410 transmits a signal representing the detected turbine speed NT to ECU 1000.

Further, an output shaft speed NOUT of transmission mechanism 300 (automatic transmission 320) is detected by an output shaft speed sensor 420. The output shaft speed sensor 420 transmits the detected output shaft speed NOUT to ECU 1000.

To ECU 1000 controlling the power train as such, a signal representing the turbine speed NT from turbine speed sensor 410, a signal representing output shaft rotation speed NOUT from output shaft speed sensor 420, and a signal representing the engine speed NE from engine speed sensor 400 are input.

These speed sensors are arranged opposite to the teeth of gears for speed detection, provided on the input shaft of torque converter 200, the output shaft of torque converter 200 and the output shaft of transmission mechanism 300. These speed sensors are capable of detecting even a slight rotation of the input shaft of torque converter 200, the output shaft of torque converter 200 and the output shaft of transmission mechanism 300, and generally, these sensors use magnetoresistance element and are referred to as semiconductor sensors.

Further, a stop lamp switch 430 transmits, when a driver operates a brake pedal by a predetermined amount, a signal indicating an on-state, to ECU 1000. Therefore, to ECU 1000, a signal representing that the brake is on, is input from stop lamp switch 430.

In the present embodiment, transmission mechanism 300 consists of a plurality of planetary gear units and a plurality of frictional engaging elements. The plurality of frictional engaging elements include clutch elements C1 to C4 and brake elements B1 to B4.

Engaging force of the plurality of frictional engaging elements of transmission mechanism 300 is adjusted by hydraulic pressure applied from hydraulic circuit 260. Hydraulic circuit 260 includes an oil pump, various solenoids, and an oil passage (all not shown). In hydraulic circuit 260, each of the solenoids operates based on a solenoid control signal from ECU 1000, whereby hydraulic pressure applied to frictional engaging elements of a predetermined combination among the plurality of frictional engaging elements is adjusted. The frictional engaging elements of the predetermined combination correspond to a selected shift position or transmission gear ratio, as shown in the operation table of automatic transmission 320 of FIG. 2. In this manner, ECU 1000 controls various solenoids of hydraulic circuit 260 and thereby control hydraulic pressure to be applied to the plurality of frictional engaging elements.

The operation table of FIG. 2 shows at which gear positions the clutch elements (C1 to C4 in the figure), brake elements (B1 to B4) and one-way clutch elements (F0 to F3) as frictional elements are engaged and released. At the first gear used at the start of the vehicle, clutch element C1 and one-way clutch elements F0 and F3 are engaged. Of these clutch elements, specifically, the clutch element C1 is referred to as an input clutch 310. Input clutch 310 is also referred to as a forward drive clutch or forward clutch and, as can be seen from the operation table of FIG. 2, it is always used in the engaged state when transmission gear ratio for forward movement of the vehicle is to be attained, except for the parking (P) position, the rear (R) position and the neutral (N) position.

If it is determined that the transmission is at the forward drive (D) position and the vehicle is in a stopped state and satisfying predetermined conditions (accelerator is off, brake is on, brake master cylinder pressure is not lower than a prescribed value and the vehicle speed is not higher than a prescribed value), the input clutch 310 is released and set to a prescribed slip state, to a substantially neutral state. Such control is referred to as the neutral control. Further, when the neutral control is executed, input clutch 310 is released and brake element B2 is set to an engaged state, to limit forward/backward movement of the vehicle. When separately determined return conditions are satisfied, the return control from the neutral control is executed, so that input clutch 310 is engaged and brake element B2 is released. The "return conditions" may be that the predetermined conditions described above are not satisfied.

In the vehicle configured as described above, the present invention is characterized in that, in the return control from the neutral control, ECU 1000 calculates the degree of progress of the return control (hereinafter referred to as return control progression degree) based on the turbine speed NT, sets the target amount of change in the turbine speed based on the calculated return control progression degree, and controls the hydraulic circuit based on the set target amount of change in the return control.

Specifically, ECU 1000 divides a difference (1) in rotation speed between the input shaft side and the output shaft side of input clutch 310 at present, by a difference (2) in rotation speed between the input shaft side and the output shaft side of input clutch 310 at the start of return control, thereby to calculate the return control progression degree.

Further, ECU 1000 sets the absolute value of target amount of change to be smaller as the calculated return control progression degree becomes higher. In the present embodiment, ECU 1000 sets the absolute value of target amount of change to a predetermined value smaller than the absolute value of target amount of change set last time, when the return control progression degree proceeds and exceeds a predetermined degree.

In the present embodiment, the amount of change of turbine speed NT to the decreasing side will be described as a positive value. Therefore, as the return control progression degree becomes higher, ECU 1000 sets the target amount of change smaller.

FIG. 3 is a functional block diagram of ECU 1000 as the controller for a vehicle in accordance with the present embodiment. ECU 1000 includes an input interface (hereinafter denoted as input I/F) 350, an operating unit 450, a storage unit 550, and an output interface (hereinafter denoted as output I/F) 650.

Input OF 350 receives the engine speed signal from engine speed sensor 400, the turbine speed signal from turbine speed sensor 410, the output shaft speed signal from output shaft speed sensor 420, and the stop lamp switch signal from stop lamp switch 430, and transmits these signals to operating unit 450. In place of, or in addition to the stop lamp switch signal, input I/F 350 may receive at least one of a master cylinder pressure signal, an accelerator pedal position signal, and a vehicle speed signal.

Operating unit 450 includes a return control determining unit 452, a speed holding unit 454, an initial control unit 456, a progression degree calculating unit 458, a target value calculating unit 460, a hydraulic pressure command value determining unit 462, a hydraulic pressure control signal output unit 464, a synchronization determining unit 466, and a terminal control unit 468.

Return control determining unit 452 determines whether or not the return control from the neutral control is to be executed. Specifically, return control determining unit 452 determines that the return control is to be executed when the above-described return conditions are satisfied. Return control determining unit 452 may set on a return control execution flag, when it is determined that the return control is to be executed.

Speed holding unit 454 holds the turbine speed NT at the start of return control, when execution of return control is determined. Specifically, when it is determined that the return control is to be executed, speed holding unit 454 holds the turbine speed NT received from turbine speed sensor 410 in storage unit 550.

Further, speed holding unit 454 holds output shaft speed NO at the start of return control, when execution of return control is determined. Specifically, when it is determined that the return control is to be executed, speed holding unit 454 holds the output shaft speed NO received from output shaft speed sensor 420 in storage unit 550.

Speed holding unit 454 may store, when the return control execution flag is turned on, the turbine speed NT and output shaft speed NO at the start of return control, in storage unit 550.

Initial control unit 456 executes initial control, when execution of return control is determined. Initial control unit 456 outputs, in the initial control, a hydraulic pressure control signal corresponding to a predetermined hydraulic pressure command value to a solenoid corresponding to input clutch 310 of hydraulic circuit 260 through output I/F 650.

Initial control unit 456 may execute the initial control when, for example, the return control execution flag is turned on. Further, when a predetermined time passes after execution of the initial control, initial control unit 456 ends the initial control.

Progression degree calculating unit 458 calculates the return control progression degree when the return control is executed. Progression degree calculating unit 458 calculates the return control progression degree by dividing the difference (1) in speed between the input shaft side and the output shaft side of input clutch 310 by the difference (2) in speed between the input shaft side and the output shaft side of input clutch 310 at the start of return control.

In the present embodiment, progression degree calculating unit 458 calculates the difference (1) in speed from the difference between the current turbine speed NT and a value as a product of current output shaft speed NO and the transmission gear ratio at the start of the vehicle. Further, progression degree calculating unit 458 calculates the difference (2) in speed from the turbine speed NT held by speed holding unit 454 and the value as a product of output shaft speed NO and the transmission gear ratio at the start of the vehicle.

In the present embodiment, the transmission gear ratio at the start of the vehicle is, for example, the transmission gear ratio that corresponds to the first gear. If automatic transmission 320 is a continuously variable transmission, the transmission gear ratio at the start of the vehicle is, for example, the transmission gear ratio corresponding to the most decelerated state.

Further, progression degree calculating unit 458 may calculate the return control progression degree when the turbine speed NT and the output shaft speed NO at the start of return control are held after the return control execution flag is turned on.

The method of calculating return control progression degree is not limited to the above and, by way of example, progression degree calculating unit 458 may calculate the return control progression degree by dividing the current turbine speed NT by the turbine speed NT at the start of return control held by speed holding unit 454.

In the present embodiment, the value of return control progression degree comes closer to zero as engagement of input clutch 310 proceeds. Specifically, when the input clutch 310 is fully engaged, difference (1) in speed attains to substantially zero and, the return control progression degree attains to zero.

In the present embodiment, the return control progression degree may also be expressed as {1−(speed difference (1)/speed difference (2))}×100(%). Here, the return control progression degree of 100% corresponds to a state in which the difference (1) in speed attains to substantially zero and the input clutch 310 is fully engaged.

Target value calculating unit 460 sets the target amount of change of turbine speed NT in accordance with the calculated return control progression degree. Target value calculating unit 460 sets the target amount of change of turbine speed NT such that its value becomes smaller as the return control progression degree changes to the advanced side (in the present embodiment, as the value of return control progression degree decreases).

Specifically, target value calculating unit 460 sets the target amount of change to a predetermined value smaller than the target amount of change set last time, when the return control progression degree attains to a predetermined degree or lower.

Further, target value calculating unit 460 sets the target turbine speed based on the set target amount of change. In the present embodiment, target value calculating unit 460 sets the target turbine speed based on the target amount of change, using the current turbine speed NT as a starting point. Specifically, target value calculating unit 460 sets the target turbine speed based on the set target amount of change and the time (for example, sample time) until the calculation for determining the next hydraulic pressure command value is executed.

Hydraulic pressure command value calculating unit 462 determines the command value of hydraulic pressure applied to input clutch 310, based on the difference between the target turbine speed and the turbine speed NT, the difference between the target amount of change and the actual amount of change of turbine speed NT, and the return control progression degree.

In the present embodiment, hydraulic pressure command value determining unit 462 calculates a feedback gain based on deviation between the target amount of change and the actual amount of change and on the return control progression degree. By way of example, hydraulic pressure command value determining unit 462 increases the feedback gain as the deviation between the target amount of change and the actual amount of change becomes larger. Further, hydraulic pressure command value determining unit 462 decreases the feedback gain as the return control progression degree changes to the advanced side (as the value of return control progression degree decreases). It is also possible to store a map, equation, table or the like representing the relation among the deviation between the target amount of change and actual amount of change, the return control progression degree and the feedback gain, in storage unit 550 beforehand.

Hydraulic pressure command value determining unit 462 determines the hydraulic pressure command value based on the deviation between the target turbine speed and the turbine speed NT and the calculated feedback gain.

Hydraulic pressure command value determining unit 462 may calculate a correction coefficient of feedback gain based on the deviation between the target amount of change and the actual amount of change and on the return control progression degree. Alternatively, hydraulic pressure command value determining unit 462 may determine the hydraulic pressure command value based on the deviation between the target turbine speed and the turbine speed NT, a predetermined feedback gain, and the calculated correction coefficient.

Hydraulic pressure control signal output unit 464 generates a hydraulic pressure control signal corresponding to the determined hydraulic pressure command value, and outputs the generated hydraulic pressure control signal to a solenoid corresponding to input clutch 310 through output I/F 650.

Synchronization determining unit 466 determines whether or not the input shaft side and the output shaft side of input clutch 310 are in synchronization. Specifically, synchronization determining unit 466 determines whether or not the turbine speed NT and a value as a product of output shaft speed NO and the transmission gear ratio (for example, gear ratio of first gear) at the start of the vehicle are synchronized. Synchronization determining unit 466 determines that turbine speed NT and the value as the product of output shaft speed NO and transmission gear ratio are synchronized, if the absolute value of difference between the two is not larger than a predetermined value.

When it is determined that turbine speed NT and the value as the product of output shaft speed NO and transmission gear ratio are synchronized, synchronization determining unit 466 may turn on a synchronization determination flag.

Terminal control unit 468 executes terminal control when turbine speed NT and the value as the product of output shaft speed NO and transmission gear ratio are synchronized. Specifically, terminal control unit 468 controls hydraulic circuit 260 such that maximum hydraulic pressure is applied to input clutch 310. Terminal control unit 468 outputs a hydraulic pressure control signal that corresponds to the maximum hydraulic pressure command value to a solenoid corresponding to input clutch 310 through output I/F 650.

Terminal control unit 468 may execute the terminal control when the synchronization determination flag is turned on.

In the present embodiment, return control determining unit 452, speed holding unit 454, initial control unit 456, progression degree calculating unit 458, target value calculating unit 460, hydraulic pressure command value determining unit 462, hydraulic pressure control signal output unit 464, synchronization determining unit 466 and terminal control unit 468 are all described as software functions realized by CPU as the operating unit 450 executing a program stored in storage unit 550. These units may be realized by hardware. The program is recorded on a recording medium and mounted on the vehicle.

Storage unit 550 stores various pieces of information, programs, threshold values, maps and the like, and data is read or stored by operating unit 450 as needed.

In the following, a control structure of a program executed by ECU 1000 as the controller for a vehicle in accordance with the present embodiment will be described with reference to FIG. 4.

At step (hereinafter "step" will be denoted as "S") 100, ECU 1000 determines whether or not the return control from the neutral control is to be executed. If execution of return control from the neutral control is determined (YES at S100), the process proceeds to S102. Otherwise (NO at S100), the process returns to S100.

At S102, ECU 1000 holds the output shaft speed NO and turbine speed NT at the start of return control. At S104, ECU 1000 determines an initial hydraulic pressure command value. At S106, ECU 1000 outputs a hydraulic pressure control signal corresponding to the determined initial hydraulic pressure command value to hydraulic circuit 260.

At S108, ECU 1000 determines whether the initial control has been terminated. If the initial control is terminated (YES at S108), the process proceeds to S110. Otherwise (NO at S108), the process returns to S108.

At S110, ECU 1000 calculates the return control progression degree. At S112, the target amount of change of turbine speed NT is calculated in accordance with the calculated return control progression degree. At S114, ECU 1000 calculates feedback gain, based on the calculated return control progression degree and on a deviation between the target amount of change and the actual amount of change.

At S116, ECU 1000 calculates the target turbine speed based on the calculated target amount of change. At S118, ECU 1000 calculates the deviation between the target turbine speed and the turbine speed NT. At S120, ECU 1000 determines the hydraulic pressure command value based on the calculated feedback gain and on the deviation between the target turbine speed and the turbine speed. At S122, ECU 1000 outputs a hydraulic pressure control signal that corresponds to the determined hydraulic pressure command value, to hydraulic circuit 260.

At S124, ECU 1000 determines whether or not turbine speed NT is synchronized with the speed of first gear synchronization (that is, the value obtained by multiplying the output shaft speed NO by the transmission gear ratio of the first gear). If the turbine speed NT is synchronized with the first gear synchronization speed (YES at S124), the process proceeds to S126. If not (NO at S124), the process returns to S110.

At S126, ECU 1000 outputs a hydraulic pressure control signal corresponding to the maximum value of hydraulic pressure command value to hydraulic circuit 260.

The operation of ECU 1000 as the controller for a vehicle in accordance with the present embodiment, based on the structure and flowchart as above, will be described with reference to FIG. 5.

By way of example, assume that the neutral control has been executed, as the vehicle satisfies predetermined conditions for executing the neutral control. Here, automatic transmission 320 is in an almost neutral state. Since the driver does not operate the accelerator, the engine is in an idle state.

When the returning conditions are satisfied by, for example, the driver reducing the amount of stepping on the brake pedal or releasing the brake pedal at time T(0), execution of the return control is determined (YES at S100). If execution of the return control is determined, the output shaft speed NO and the turbine speed NT at the start of return control are held (S102). The vehicle is in the stopped state and, therefore, the output shaft speed NO is substantially zero.

Further, at time T(0), initial control for input clutch 310 is executed. Together with the engagement control of input clutch 310, release control of brake element B2 is also executed. Specifically, the initial hydraulic pressure command value P(1) is determined (S104), and a hydraulic pressure control signal corresponding to the initial hydraulic pressure command value P(1) is output to hydraulic circuit 260 (S106). Therefore, as shown in FIG. 5, at time T(0), the hydraulic pressure command value increases stepwise from P(0) to P(1). By the execution of initial control, backlash of input clutch 310 is reduced. Engagement of input clutch 310 starts after the backlash is reduced and, therefore, turbine speed NT begins to decrease in the latter half of the initial control.

If the end of initial control is determined at time T(1) after a prescribed time period from time T(0) (YES at S108), the hydraulic pressure command value is decreased from P(1) to a hydraulic pressure command value P(2) set as an initial value for feedback control. Then, the return control progression degree is calculated (S110).

As can be seen from the dotted line in FIG. 5, from the calculated return control progression degree, the target amount of change in turbine speed is calculated (S112). Based on the calculated return control progression degree and the target amount of change, the feedback gain is calculated (S114). Further, based on the calculated target amount of change, the target turbine speed is calculated (S116). The deviation between the calculated target turbine speed and the turbine speed NT is calculated (S118). Based on the calculated feedback gain and the deviation between the calculated target turbine speed and the turbine speed NT, the hydraulic pressure command value is determined (S120).

When the hydraulic pressure command value is determined, a hydraulic pressure control signal that corresponds to the determined hydraulic pressure command value is output (S122). If the turbine speed NT is not synchronized with the first gear synchronization speed (NO at S124), the return control progression degree is calculated again (S110). In this manner, the engaging force of input clutch 310 increases with time and, therefore, turbine speed NT decreases because of the drag of torque converter 200.

In the initial period of feedback control (time T(1) to T(2)) from the start of return control until the return control progression degree attains to 50% (0.5), automatic transmission 320 is in almost neutral state and, therefore, as the absolute value of target amount of change of turbine speed NT, a larger value is set than in the period later than the initial period. Consequently, the turbine speed decreases at the highest rate in the initial period during the entire period of return control.

In the middle period of feedback control (time T(2) to T(3)) from when the return control progression degree attained to 50% (0.5) until it attains to 80% (0.2), the target amount of change is smaller than in the initial period and it decreases as the return control proceeds. Therefore, turbine speed NT changes moderately.

Further, in the later period of feedback control (time T(3) to T(5)) from when the return control progression degree attained to 80% (0.2) until the start of the terminal control, the target amount of change is substantially zero. Therefore, turbine speed changes still more moderately. When the vehicle starts moving at time T(4), the output shaft speed NO increases and, therefore, the first gear synchronization speed also starts to increase. Further, increase in the output shaft speed NO reduces the degree of drag of torque converter 200 and, therefore, the turbine speed also increases. When the turbine speed and the first gear synchronization speed are synchronized at time T(5) (YES at S124), the terminal control is executed. Specifically, the hydraulic pressure control signal that corresponds to the maximum value of hydraulic pressure command value is output to hydraulic circuit 260 (S126).

The vehicle controller in accordance with the present embodiment operates as described above and, in the automatic transmission, at the start of return control from the neutral control (with the degree of progress small), the input clutch is in a state close to the neutral state. As the return control proceeds (the degree of progress increases), the input clutch comes closer to the engaged state. As the engagement of input clutch proceeds, the turbine speed decreases because of drag of the torque converter. Therefore, the return control progression degree calculated based on the turbine speed corresponds to the state of change of the input clutch including variation caused by a change in engine torque or torque ratio. Therefore, when the degree of progress is small (the return control progression degree is large) and the input clutch is in a state closer to neutral, the turbine speed can be lowered faster to the turbine speed after return, if the target amount of change is set large. As a result, the time necessary for the return control can be reduced. Further, even when the turbine speed decreases quickly, occurrence of shock can be prevented as the automatic transmission is in an almost neutral state.

When the degree of progress is large (the value of return control progression degree is small) and the input clutch is in a state closer to the engaged state, fluctuation in the turbine speed is reduced as the target amount of change is set smaller, and hence, any shock caused by the engagement at the end of return control can be prevented.

Since the hydraulic pressure applied to the input clutch is controlled based on the target amount of change, hydraulic control becomes possible that better accommodates variation caused by any change in engine torque or torque ratio than when the hydraulic pressure is controlled such that the turbine speed comes closer to the target value. As a result, hydraulic pressure necessary for the return control can be applied to the input clutch with higher accuracy.

Therefore, vehicle controller and control method that enable quick recovery from the neutral control without causing any shock can be provided.

Further, the hydraulic circuit is controlled such that the hydraulic pressure determined based on the difference between the target turbine speed and turbine speed NT and on the difference between the target amount of change and the amount of change in the turbine speed NT is input to the input clutch. Particularly, the target amount of change is set dependent on the return control progression degree, and hence it is possible to have the state of change in turbine speed in the return control set to the same state every time the return control is conducted, regardless of any change in engine torque or torque ratio. Therefore, quick recovery from the neutral control is possible while preventing occurrence of any shock, every time the return control takes place.

Further, at a time point when the value as a product of output shaft rotation speed and transmission gear ratio at the start of the vehicle is synchronized with the detected turbine speed, relative rotation speed between the input shaft side and the output shaft side of the input clutch attains to substantially zero and the hydraulic circuit is controlled such that the highest hydraulic pressure is applied. Therefore, the input clutch can be set to the fully engaged state while preventing occurrence of any shock.

In the return control from the neutral control, when the input clutch comes to be engaged from the almost neutral state and if the output shaft speed NO is low as in the case in which the vehicle is stopped, the torque converter is dragged and, therefore, turbine speed NT decreases as the engagement of input clutch proceeds. Therefore, by dividing the current turbine speed by the turbine speed detected at the start of return control, or by dividing the difference between the current turbine speed and the value as a product of the output shaft speed and the transmission gear ratio at the start of the vehicle by the difference at the start of return control between the detected turbine speed and the value as a product of output shaft rotation speed of the transmission mechanism and the transmission gear ratio at the start of the vehicle, the return control progression degree can be calculated.

<Second Embodiment>

In the following, a vehicle controller in accordance with the second embodiment will be described. The vehicle controller in accordance with the present embodiment is different in part of the operation of functional blocks of ECU 1000 from the configuration of the above-described vehicle having the vehicle controller in accordance with the first embodiment mounted thereon. Except for this point, it has the same configuration as that of the above-described vehicle having the vehicle controller in accordance with the first embodiment mounted thereon. The same components are denoted by the same reference characters, and their functions are also the same. Therefore, detailed description thereof will not be repeated.

In the present embodiment, ECU 1000 is characterized in that inclination of turbine speed is set every time there is a transition between a plurality of periods (in the following referred to as phases) determined by the return control progression degree, and the target turbine speed is set based on the inclination (target amount of change) of the turbine speed corresponding to each period with the time of setting used as a starting point.

Specifically, in the present embodiment, the process of return control is divided into Phase (1) to Phase (3) in accordance with the return control progression degree. By way of example, a threshold value of return control progression degree for the transition from Phase (1) to Phase (2) and a threshold value of return control progression degree for the transition from Phase (2) to Phase (3) are set in advance. The number of divisions is not limited to three, and it may be divided into four or more. For each of Phase (1) to Phase (3), inclination of turbine speed is set in advance.

At the start of return control, ECU 1000 holds the turbine speed NT and the output shaft speed NO at the start, and calculates the return control progression degree. Based on the calculated return control progression degree, ECU 1000 determines whether or not phase transition has occurred. Every time there is a transition from Phase (1) to Phase (2) or from Phase (2) to Phase (3), ECU 1000 sets the inclination of turbine speed NT. The inclination of turbine speed set for each phase is set to be smaller as the phase proceeds (from Phase (1) to Phase (2) and further to Phase (3)).

Based on the set inclination of turbine speed, ECU 1000 sets the target turbine speed. In the present embodiment, ECU 1000 sets the target turbine speed based on the inclination of turbine speed NT, using the turbine speed NT at the time when the inclination of turbine speed NT is set as a starting point.

Specifically, in the period of Phase (1), ECU 1000 sets the target turbine speed such that the turbine speed NT decreases with the inclination corresponding to Phase (1) with the turbine speed NT held at the start of return control used as the starting point.

Further, in the period of Phase (2), ECU 1000 sets the target turbine speed such that the turbine speed NT changes with the inclination corresponding to Phase (2) with the turbine speed NT at the transition from Phase (1) to Phase (2) used as the starting point.

Similarly, in the period of Phase (3), ECU 1000 sets the target turbine speed such that the turbine speed NT changes with the inclination corresponding to Phase (3) with the turbine speed NT at the transition from Phase (2) to Phase (3) used as the starting point.

The functional block of ECU 1000 as the vehicle controller in accordance with the present embodiment is the same as the functional block of ECU 1000 described with reference to FIG. 3 except for the operations of target value calculating unit 460 and hydraulic pressure command value determining unit 462. Detailed description thereof will not be repeated here.

Target value calculating unit 460 determines the phase in accordance with the calculated return control progression degree, and sets the inclination of turbine speed NT corresponding to the determined phase. Further, target value calculating unit 460 sets the target turbine speed such that it comes to have the inclination corresponding to each phase, with the turbine speed NT at the time of transition to the current phase used as a starting point.

For example, target value calculating unit 460 sets as the target turbine speed a value obtained by subtracting, from the turbine speed NT at the transition to the current phase, a product of time lapse from the time point of transition to the current phase till the present time point and the inclination corresponding to the current phase.

Hydraulic pressure command value determining unit 462 determines the command value of hydraulic pressure to be applied to the input clutch 310 based on the deviation between the target turbine speed and the turbine speed NT.

In the following, a control structure of a program executed by ECU 1000 as the vehicle controller in accordance with the present embodiment will be described with reference to FIG. 6.

In the flowchart of FIG. 6, the same process steps as in the flowchart of FIG. 4 are denoted by the same step numbers. The processes are also the same. Therefore, detailed description thereof will not be repeated here.

At S200, ECU 1000 determines a phase based on the calculated return control progression degree. At S202, ECU 1000 sets the inclination of turbine speed corresponding to the determined phase. At S204, ECU 1000 calculates the target turbine speed based on the inclination of the turbine speed NT set with the time of transition to the phase used as the starting point. At S206, ECU 1000 determines the hydraulic command value based on the deviation between the calculated target turbine speed and the turbine speed NT.

The operation of ECU 1000 as the vehicle controller in accordance with the present embodiment based on the structure and flowchart as above will be described with reference to FIG. 7. The operation until time point T(1) is the same as that of ECU 1000 as the vehicle controller in accordance with the first embodiment described with reference to FIG. 5 and, therefore, detailed description thereof will not be repeated.

When it is determined at time point T(1) after the lapse of a predetermined time period from T(0) that the initial control is terminated (YES at S108), the hydraulic pressure command value is decreased from P(1) to hydraulic pressure command value P(2) set as the initial value for feedback control. Then, the return control progression degree is calculated (S110).

Based on the calculated return control progression degree, the phase is determined (S200). Specifically, with the return control progression degree being 0% to 50%, it is specified that the current phase is Phase (1). Therefore, the inclination of turbine speed NT corresponding to Phase (1) is set (S202). Further, based on the set inclination of turbine speed NT, the target turbine speed is calculated (S204).

The deviation between the target turbine speed and the turbine speed NT is calculated (S118), and based on the calculated deviation, the hydraulic pressure command value is determined (S206).

A hydraulic pressure control signal that corresponds to the determined hydraulic pressure command value is output (S122). Consequently, the engaging force of input clutch 310 increases, torque converter 200 drags and turbine speed NT decreases. If the turbine speed NT is not synchronized with the first gear synchronization speed (NO at S124), the return control progression degree is calculated again (S110).

In Phase (1) that is from the start of return control until the return control progression degree attains to 50% (0.5) (from time T(1) to T'(2)), automatic transmission 320 is in the almost neutral state and, therefore, the inclination is larger than in Phase (2) or Phase (3) (rate of decrease is high). Therefore, the rate of decrease of turbine speed in Phase (1) is the highest in the entire period of return control.

In Phase (2) in which the return control progression degree attains from 50% (0.5) to 80% (0.2) (from time T'(2) to T'(3)), the inclination of turbine speed NT is set smaller than in Phase (1) (rate of decrease is lower). Therefore, turbine speed NT changes more moderately than in Phase (1).

Further, in Phase (3) from when the return control progression degree attains to 80% (0.2) until the start of terminal control (from time T'(3) to T'(4)), the inclination of turbine speed NT is zero. Therefore, the change of turbine speed becomes more moderate. At time T'(4), when output shaft speed NO increases as the vehicle starts moving and the turbine speed NT is synchronized with the first gear synchronization speed (YES at S124), the terminal control is executed. Specifically, the hydraulic pressure control signal that corresponds to the maximum value of hydraulic pressure command value is output to hydraulic circuit 260 (S126).

As described above, the vehicle controller in accordance with the present embodiment attains effects similar to those attained by the vehicle controller in accordance with the first embodiment.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A vehicle controller for a vehicle provided with an engine and an automatic transmission having an engaging element engaged by using hydraulic pressure when the vehicle starts, wherein when said vehicle stops in a forward drive position while predetermined conditions of vehicle state are satisfied, neutral control of releasing said engaging element is executed, and when separately determined conditions are satisfied, a return control of engaging said engaging element is executed, said automatic transmission includes a fluid coupling coupled to an output shaft of said engine, a transmission mechanism coupled to an output shaft of said fluid coupling and a hydraulic circuit applying hydraulic pressure to said engaging element;

said controller comprising:

a turbine speed sensor detecting turbine speed of said fluid coupling; and a control unit connected to said turbine speed sensor; wherein said control unit calculates degree of progress of the return control based on said detected turbine speed during said return control, sets a target amount of change of the turbine speed in accordance with the calculated degree of progress, and controls said hydraulic circuit based on said set target amount of change in said return control.

2. The vehicle controller according to claim 1, wherein said control unit sets said target amount of change to have smaller absolute value as said degree of progress becomes higher.

3. The vehicle controller according to claim 2, wherein said control unit sets the absolute value of said target amount of change to a predetermined value smaller than the absolute value of target amount of change set last time, when said degree of progress proceeds exceeding a predetermined degree.

4. The vehicle controller according to claim 1, wherein said control unit sets a target turbine speed based on said set target amount of change, and controls said hydraulic circuit such that a hydraulic pressure determined based on a difference between said set target turbine speed and said detected turbine speed and on a difference between said target amount of change and an amount of change in said turbine speed is applied to said engaging element.

5. The vehicle controller according to claim 4, wherein said control unit sets the target turbine speed based on said target amount of change using current turbine speed as a starting point.

6. The vehicle controller according to claim 4, wherein said control unit sets the target turbine speed based on said target amount of change using turbine speed at a time point when said target amount of change is set as a starting point.

7. The vehicle controller according to claim 1, further comprising an output shaft speed sensor connected to said control unit and detecting output shaft speed of said transmission mechanism; wherein said control unit controls said hydraulic circuit such that maximum hydraulic pressure is applied to said engaging element when a product of said detected output shaft speed and transmission gear ratio at a start of said vehicle is synchronized with said detected turbine speed.

8. The vehicle controller according to claim 1, wherein said control unit calculates said degree of progress by dividing current turbine speed by the turbine speed detected at a start of said return control.

9. The vehicle controller according to claim 1, wherein said control unit calculates said degree of progress by dividing a first difference of rotation speed between input shaft side and output shaft side of said engaging element by a second difference of rotation speed between the input shaft side and the output shaft side of said engaging element at the start of said return control.

10. The vehicle controller according to claim 9, wherein said first difference of rotation speed represents a difference between said detected turbine speed and a product of the output shaft speed of said transmission mechanism and a transmission gear ratio at a start of said vehicle; and said second difference of rotation speed represents a difference, at the start of said return control, between said detected turbine speed and a product of the output shaft speed of said transmission mechanism and the transmission gear ratio at a start of said vehicle.

11. A method of controlling a vehicle provided with an engine and an automatic transmission having an engaging element engaged by using hydraulic pressure when the vehicle starts, wherein when said vehicle stops in a forward drive position while predetermined conditions of vehicle state are satisfied, neutral control of releasing said engaging element is executed, and when separately determined conditions are satisfied, a return control of engaging said engaging element is executed, said automatic transmission includes a fluid coupling coupled to an output shaft of said engine, a transmission mechanism coupled to an output shaft of said fluid coupling and a hydraulic circuit applying hydraulic pressure to said engaging element;

said method comprising:

a step of detecting a turbine speed of said fluid coupling;

a calculating step of calculating degree of progress of the return control based on said detected turbine speed during said return control;

a setting step of setting a target amount of change of the turbine speed in accordance with the calculated degree of progress, and a control step of controlling said hydraulic circuit based on said set target amount of change in said return control.

12. The vehicle control method according to claim 11, wherein in said setting step, said target amount of change is set to have smaller absolute value as said degree of progress becomes higher.

13. The vehicle control method according to claim 12, wherein in said setting step, the absolute value of said target amount of change is set to a predetermined value smaller than the absolute value of target amount of change set last time, when said degree of progress proceeds exceeding a predetermined degree.

14. The vehicle control method according to claim 11, further comprising a target setting step of setting a target turbine speed based on said set target amount of change; wherein in said control step, said hydraulic circuit is controlled such that a hydraulic pressure determined based on a difference between said set target turbine speed and said detected turbine speed and on a difference between said target amount of change and an amount of change in said turbine speed is applied to said engaging element.

15. The vehicle control method according to claim 14, wherein in said target setting step, the target turbine speed is set based on said target amount of change using current turbine speed as a starting point.

16. The vehicle control method according to claim 14, wherein in said target setting step, the target turbine speed is set based on said target amount of change using turbine speed at a time point when said target amount of change is set as a starting point.

17. The vehicle control method according to claim 11, further comprising:

a step of detecting output shaft speed of said transmission mechanism; and a step of controlling said hydraulic circuit such that maximum hydraulic pressure is applied to said engaging element when a product of said detected output shaft speed and transmission gear ratio at a start of said vehicle is synchronized with said detected turbine speed.

18. The vehicle control method according to claim 11, wherein in said calculating step, said degree of progress is calculated by dividing current turbine speed by the turbine speed detected at a start of said return control.

19. The vehicle control method according to claim 11, wherein in said calculating step, said degree of progress is calculated by dividing a first difference of rotation speed between input shaft side and output shaft side of said engaging element by a second difference of rotation speed between the input shaft side and the output shaft side of said engaging element at the start of said return control.

20. The vehicle control method according to claim 19, wherein said first difference of rotation speed represents a difference between said detected turbine speed and a product of the output shaft speed of said transmission mechanism and a transmission gear ratio at a start of said vehicle; and said second difference of rotation speed represents a difference, at the start of said return control, between said detected turbine speed and a product of the output shaft speed of said transmission mechanism and the transmission gear ratio at a start of said vehicle.

* * * * *